US010977008B1

(12) United States Patent
Houlemarde

(10) Patent No.: US 10,977,008 B1
(45) Date of Patent: Apr. 13, 2021

(54) SINGLE DATA CLASS FOR IN-MEMORY CREATION AND PROGRAMMATIC ACCESS OF ARBITRARY DATA IN A STRONGLY-TYPED COMPUTER PROGRAMMING LANGUAGE

(71) Applicant: First Capitol Consulting, Inc., Los Angeles, CA (US)

(72) Inventor: Lou R. Houlemarde, Burbank, CA (US)

(73) Assignee: FIRST CAPITOL CONSULTING, INC., Los Angeles, CA (US)

( * ) Notice: Subject to any disclaimer, the term of this patent is extended or adjusted under 35 U.S.C. 154(b) by 0 days.

(21) Appl. No.: 16/990,388

(22) Filed: Aug. 11, 2020

(51) Int. Cl.
*G06F 8/30* (2018.01)
*G06F 16/21* (2019.01)
*G06F 8/41* (2018.01)

(52) U.S. Cl.
CPC ............... *G06F 8/315* (2013.01); *G06F 8/41* (2013.01); *G06F 16/211* (2019.01)

(58) Field of Classification Search
CPC .......... G06F 8/315; G06F 16/211; G06F 8/41; G06F 16/278; G06F 16/2282; G06F 16/252; G06F 16/2455; G06F 16/27
See application file for complete search history.

(56) References Cited

U.S. PATENT DOCUMENTS

| | | | |
|---|---|---|---|
| 6,101,502 A * | 8/2000 | Heubner | G06F 16/284 |
| 8,239,849 B2 | 8/2012 | Burns et al. | |
| 2015/0178366 A1 * | 6/2015 | Farahbod | G06F 16/217 |
| | | | 707/603 |
| 2017/0169072 A1 * | 6/2017 | Crawford | G06F 11/1474 |

OTHER PUBLICATIONS

R. F. Freitas et al.; Storage-class memory The next storage system technology; IBM; pp. 439-447; retrieved on Feb. 16, 2021 (Year: 2008).*
Chihiro Matsui et al.; Dynamic Adjustment of Storage Class Memory Capacity in Memory-Resource Disaggregated Hybrid Storage With SCM and NAND Flash Memory; IEEE; pp. 1799-1810; retrieved on Feb. 16, 2021 (Year: 2019).*

* cited by examiner

*Primary Examiner* — S. Sough
*Assistant Examiner* — Cuong V Luu
(74) *Attorney, Agent, or Firm* — Panitch Schwarze Belisario & Nadel LLP

(57) ABSTRACT

A method and computer program product are provided for defining a dynamic data storage class in-memory using a strongly-typed compiled language, and accessing data in the memory. A schema is defined of one or more key-value pairs of field names and data types, wherein the schema represents columns of a table in the memory. A table key is declared that represents the table in the memory. The dynamic data storage class is instantiated, using the strongly-typed compiled language, by passing the table key. Each instantiation of the dynamic data storage class is an individual row of the table in the memory. Fields of the dynamic data storage class are accessed by an overloaded indexer that uses strings as the field names in the schema.

8 Claims, 4 Drawing Sheets

START

↓

400 - Define a schema of one or more key-value pairs of field names and data types, wherein the schema represents columns of a table in the memory

↓

402 – Declare a table key that represents the table in the memory.

↓

404 - Instantiate, using the strongly-typed compiled language, the dynamic data storage class by by passing the table key, wherein each instantiation of the dynamic data storage class is an individual row of the table in the memory

↓

406 - Access fields of the dynamic data storage class by an overloaded indexer that uses strings as the field names in the schema

↓

END

SINGLE DATA CLASS FOR IN-MEMORY CREATION AND PROGRAMMATIC ACCESS OF ARBITRARY DATA IN A STRONGLY-TYPED COMPUTER PROGRAMMING LANGUAGE

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In-memory processing of data has become much more prevalent. In the past, the size of data was relatively large compared to the available memory, and thus it was more important to think about how it was stored on disk media in terms of efficient access. With advances in memory technologies now outpacing the growth of many types of data, it is now possible efficiently store and work with data in-memory, as entire data sets can often fit within a computer. To illustrate, a company of 10,000 employees in the past may have had to process payroll information entirely within a database system that accesses disk media, for example using SQL to manipulate records. Complex database software was used to shuttle data back and forth and keep data indexed for efficient access. That same data can now fit easily into a computer many times over. Any inefficiencies lost with processing all the data in-memory, for example using brute-force methods compared to elegant SQL, would pale in comparison to having to access disk I/O, which is typically orders of magnitude slower.

Therefore, the problem and challenge of modern data processing is creating in-memory structures and methods to make it easier to work with data. Efficiency is also important, but it becomes much more paramount to make programmatic creation and access of data easier for software developers, and by extension, end users. To illustrate this importance, whole new languages, such as R, have been created around the storage and processing of data in-memory. Other languages have had to back-fit and create libraries to access generic data. Unfortunately, this shift towards in-memory processing has created several problems for strongly-typed languages and makes such supporting changes to the language and/or its libraries problematic at best.

At the heart of the problem is that data is malleable, evolving, and even user-defined. This notion is generally incompatible with the basic structure of a strongly-typed language, the class. A class has predefined properties by the programmer and once set, cannot generally be changed. An attempt to overcome this limitation for instance is the Expando class created for the DotNet (.NET) framework, where the programmer can add different properties dynamically. However, this is woefully inadequate in that it is inefficient for storing tabular data and it does not even directly work with one of the most important features of DotNet, namely, Language-Integrated Query (LINQ), making Expando's usefulness very limited. The other approach for this framework, and indeed an earlier approach, was the creation of the DataSet library that more efficiently dealt with the concept of in-memory tables comprising of rows and columns. Although workable for many use cases, the DataSet library suffers from the design limitation that it was to be front-end for a disk-based database system. It was largely ignored after LINQ and Object Relational Mapper (ORM) tools were introduced.

Accordingly, the data analytics industry has beaten a new path, creating new structures and libraries specifically for in-memory tabular storage of data, which are often incompatible with existing programming techniques. This presents a problem for many languages like C#, and indeed companies who have invested much into strongly-typed DotNet codebases. That is, very little of the in-language such as collections and LINQ can be used with these data libraries, and in particular, they must often import huge libraries that effectively contain another language just to support these new data classes. This is not ideal and often unacceptable, and is the problem that the present invention solves.

BRIEF SUMMARY OF THE INVENTION

A method is provided for storing arbitrary data by means of a special singular class that overcomes limitations present in a strongly-typed language and other libraries for storing, accessing and processing data in-memory. A programmer can instantiate the class as a primary object of arbitrary unit (or row) of data storage and use it freely in language-specific collections and operations without restriction.

More specifically, a single software class is provided in a compiled language that has a method to declare a tabular data storage in-memory with (1) an organization or structure for a database (schema) and (2) a schema key reference. The schema comprises one or more collections of field names and data types. The storage for a row of tabular data is instantiated using key and key-value pairs of data in said key reference. The fields of the software class are then accessible by an overloaded string indexer which matches the field names in the schema. Field names are interchangeably referred to as "column names" herein.

This software class solves a need for dynamic data classes in strongly-typed/statically-typed languages like C#, while still being accessible by query tools such as LINQ in the .Net family of languages. This is not possible using the built-in tools for that framework, for example.

A dynamic data class (also, referred to herein as a "dynamic data storage class") is a way to support storing arbitrary data during run time, as opposed to a typical class that has fixed properties and thus can only store predefined data.

A strongly-typed language (also, referred to herein as a "strongly-typed compiled language") is a computer language that primarily supports the notion of immutably-defined properties and methods of a pre-declared type that will be known to the compiler, so that any mistyping within a computer program generate an error at that time (a compile-time error). This contrasts with a language that is not strongly typed, where typically the interpreter will only catch a mistyping at run-time.

Thus, the programmer using preferred embodiments of the present invention can incorporate a flexible in-memory data module into a program. This is more advantageous than using typical built-in dynamic libraries which cannot be compiled into integrated query systems, and moreover, are not optimized to store tabular data. Preferred embodiments of the present invention solve both concerns by being both (1) queryable in frameworks like LINQ, and (2) optimized to declare and store arbitrary data. Further, this is accomplished in a strongly-typed and compiled language like C#, where typically this flexibility does not exist.

BRIEF DESCRIPTION OF THE DRAWINGS

Preferred embodiments of the present invention will now be described by way of example with reference to the accompanying drawings.

DETAILED DESCRIPTION OF THE INVENTION

Figure 1:
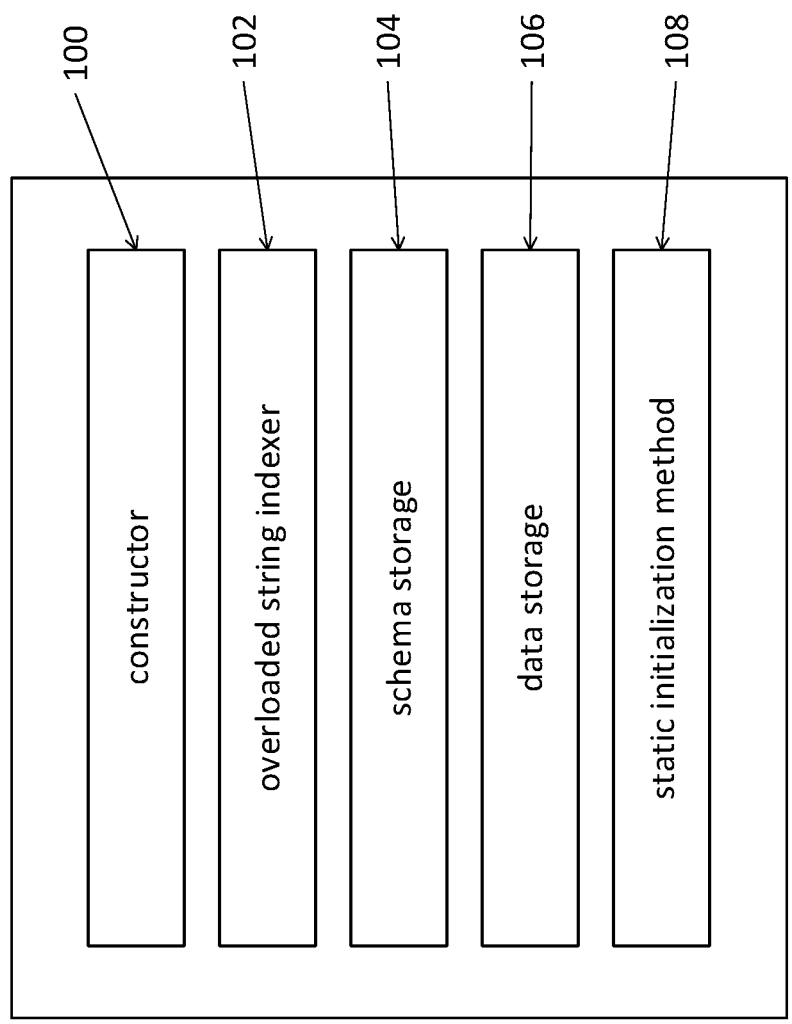
FIG. 1 is a diagram of the single data class as it exists within a strongly typed-language.

Certain terminology is used herein for convenience only and is not to be taken as a limitation on the present invention.

The words "a" and "an", as used in the claims and in the corresponding portions of the specification, mean "at least one."

This patent application includes an Appendix having a file named appendix688646-7US.txt, created on Jul. 30, 2020, and having a size of 25,199 bytes. The Appendix is incorporated by reference into the present patent application. One preferred embodiment of the present invention is implemented via the source code in the Appendix. The Appendix is subject to the "Copyright Notice and Authorization" stated above.

I. OVERVIEW

A key feature of the present invention is the use of a single class in a strongly-typed computer language. This class uses a static method to initialize tabular storage in-memory by passing a schema of one or more pairs of names and types, which can be considered the columns of a table. The initializer returns a table key that represents that table in-memory. Once this table key has been obtained, it can then instantiate the class with the table key and, optionally, the data itself. Each instantiation object of the class can be considered an individual row in the table. To access fields of the class, an overloaded indexer with the column name as the index to the column is used.

A preferred embodiment of the present invention is unique from other data storage libraries as the single class disclosure makes the row the main object, and disconnects it from the notion of a fixed table. This more closely aligns with object-oriented programming techniques where objects have fixed properties, but also allows for the flexibility of storing arbitrary data. It also allows the instantiated object itself to be contained in collections, dictionaries, lists and other structures that the language supports. As such, it can be enumerated and queried like any typed object with LINQ, which has a rich set of functionality like grouping and sorting. This is again unlike existing constructs such as DataFrames and DataTables, where the object represents a table of data in its entirety, and programmatic functionality is limited to what the authors decide to support and expose to the caller.

A further advantage of a singular class for storing data is that data can be processed more efficiently in-memory in many circumstances. For example, a common activity for in-memory processing of data is a join operation, and one of the most memory-intensive joins is a cross-join. Most libraries such as the DataFrame must create a new object and copy the data from the two DataFrames being joined to the new DataFrame. In contrast, the singular class of the disclosure can be used to simply combine the elements from both sides of the joins, using multiple references to the same objects, without copying any internal data into a resulting projection. As long as the resulting schema for the join and projection is determined for the overall collection, the caller can enumerate the collection and access the columns of the joined data as if it was a single resulting table.

II. DETAILED DISCLOSURE

FIG. 1 is a diagram of the single data class as it exists within a strongly typed-language. Constructor 100 is used to instantiate an instance of a dynamic data storage class given a key to a schema within the schema storage 104. The overloaded string indexer 102 is declared as part of the class and is used to access the data storage 106 and the individual data elements using the name of the field. The schema storage 104 comprises a storage area or areas in-memory for schemas which can be referenced by a key. The data storage 106 is an area or areas in-memory storing the actual data which can be accessed by a key, index or reference. A static initialization method 108 is used to initialize the data storage 106 given a schema, which is also added to schema storage 104.

Figure 2:
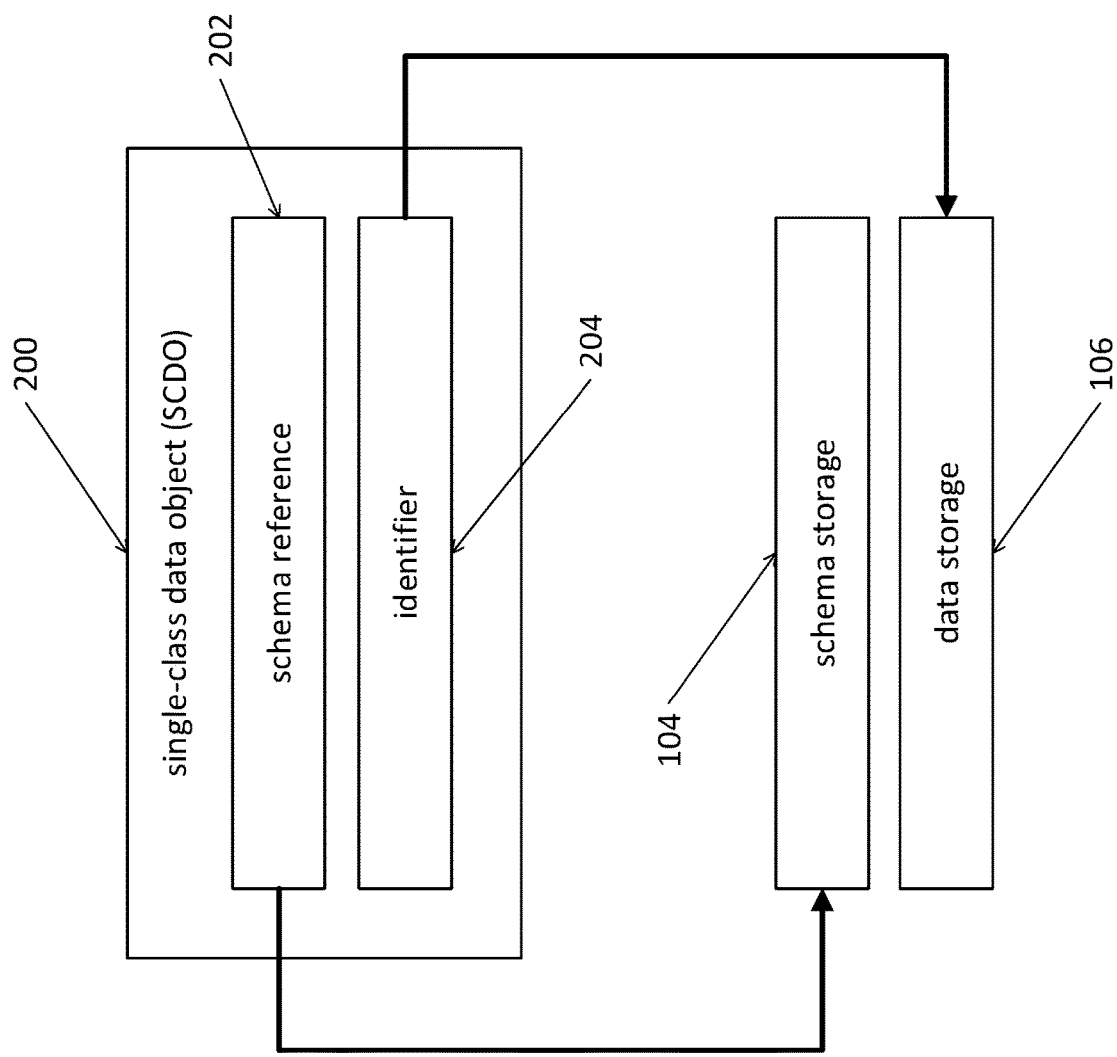
FIG. 2 is a diagram of the simple instantiation of the single class data object.

FIG. 2 is a diagram of the simple instantiation of the single data class, called a single class data object (SCDO) 200, in accordance with a preferred embodiment of the present invention. The data object 200 intrinsically holds a schema reference 202 to look up the schema storage 104. The data object 200 also holds an identifier 204 which is used as a key to look up the actual data located in the data storage 106. Combined, this is sufficient information to find an individual element of data when the overloaded string indexer 102 is used.

Figure 3:
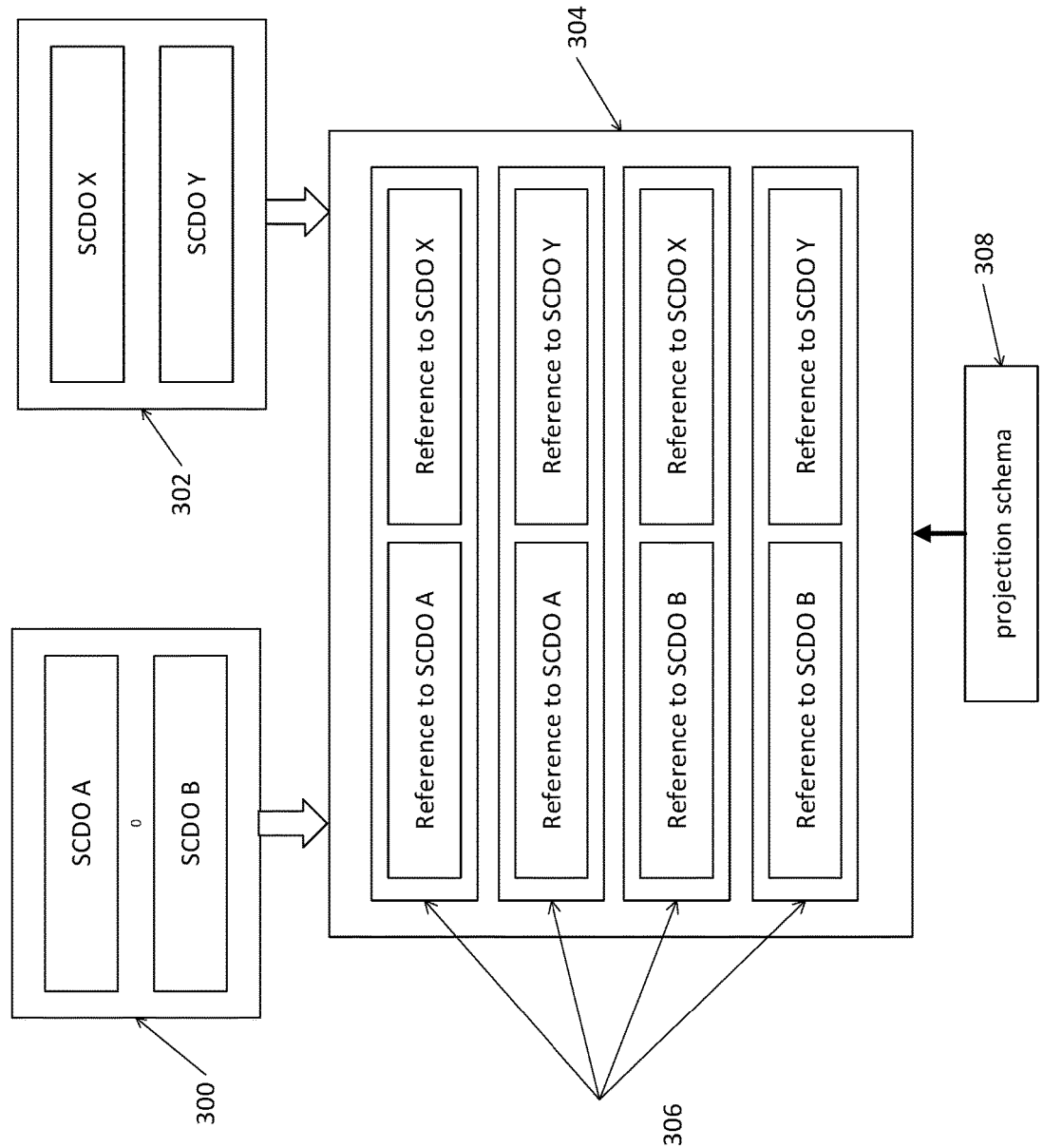
FIG. 3 is an illustration of a memory-efficient cross-join and projection operation of two collections of data objects.

FIG. 3 shows an additional embodiment of the invention as a composite dynamic data storage class and its usage in creating a memory-efficient cross join. Two collections of single-class data objects (SCDO's) are provided, namely, a left side 300 and a right side 302. The resulting cross join of these two collections is represented by a cross-product collection 304 of composite SCDO's 306, each of which simply contains a reference to the actual SCDO that contains the data. Thus, each instance of the composite dynamic data storage class does not need to be passed any data as it is already contained in the left and right SCDO's. Projection schema 308 can be used to select fields from the left and/or right side when accessing the fields of an instance. The advantage here is that no data needs to be copied in-memory during the instantiation of the objects or the projection of the resulting collection.

Figure 4:
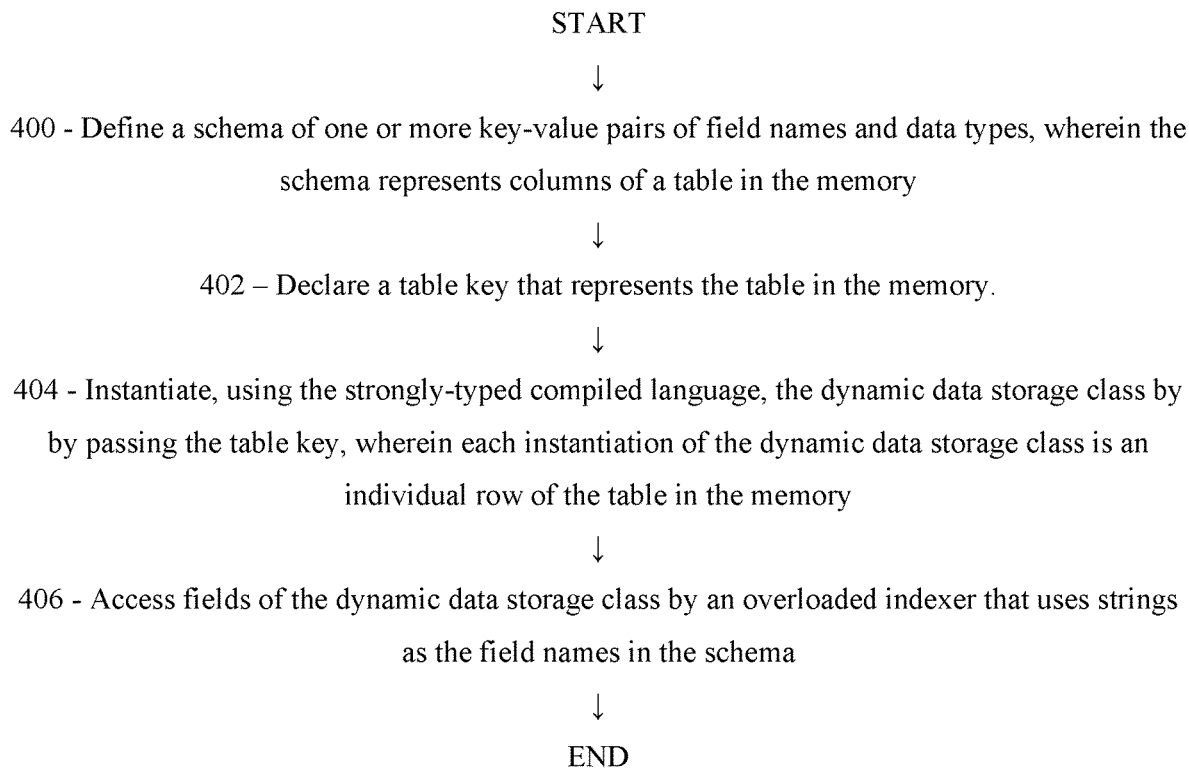
FIG. 4 shows a flowchart of one preferred embodiment of the present invention.

FIG. 4 shows a flowchart of one preferred embodiment of the present invention for defining a dynamic data storage class in-memory using a strongly-typed compiled language, and accessing data in the memory. The preferred embodiment operates as follows:

STEP 400: Define a schema of one or more key-value pairs of field names and data types, wherein the schema represents columns of a table in the memory.

STEP 402: Declare a table key that represents the table in the memory.

STEP 404: Instantiate, using the strongly-typed compiled language, the dynamic data storage class by passing the table key, wherein each instantiation of the dynamic data storage class is an individual row of the table in the memory. A constructor may be used that allows key-value pairs to be passed that represent the individual row of the table in the memory.

STEP 406: Access fields of the dynamic data storage class by an overloaded indexer that uses strings as the field names in the schema.

The present invention is preferably implemented in software code which can be executed on any suitable processor or collection of processors, whether provided in a single computer or distributed among multiple computers. One preferred embodiment of the software code is shown in the Appendix. The Appendix includes the following parts:

Part 1: Dynamic Data Storage Class
Part 2: Composite Dynamic Data Storage Class

In the source code, the table key described herein is referred to as "dataStoreName."

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

As explained above, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method for defining a dynamic data storage class in-memory using a strongly-typed compiled language, and accessing data in the memory, the method comprising:
    (a) defining a schema of one or more key-value pairs of field names and data types, wherein the schema represents columns of a table in the memory;
    (b) declaring a table key that represents the table in the memory;
    (c) instantiating, using the strongly-typed compiled language, the dynamic data storage class by passing the table key, wherein each instantiation of the dynamic data storage class is an individual row of the table in the memory; and
    (d) accessing fields of the dynamic data storage class by an overloaded indexer that uses strings as the field names in the schema.

2. The method of claim 1 wherein in step (c) the dynamic data storage class is further instantiated by passing left side and right side single class data objects, thereby defining a composite dynamic data storage class.

3. The method of claim 1 wherein step (c) further comprises using a constructor that allows key-value pairs to be passed that represent the individual row of the table in the memory.

4. The method of claim 1 wherein the instantiation in step (c) further includes passing data representing the individual row of the table in the memory.

5. A computer program product for defining a dynamic data storage class in-memory using a strongly-typed compiled language, and accessing data in the memory, the computer program product comprising a non-transitory computer readable storage medium tangibly embodying computer-executable program instructions thereon that, when executed, causes a computing device to:

(a) define a schema of one or more key-value pairs of field names and data types, wherein the schema represents columns of a table in the memory;

(b) declare a table key that represents the table in the memory;

(c) instantiate, using the strongly-typed compiled language, the dynamic data storage class by passing the table key, wherein each instantiation of the dynamic data storage class is an individual row of the table in the memory; and (d) access fields of the dynamic data storage class by an overloaded indexer that uses strings as the field names in the schema.

6. The computer program product of claim 5 wherein the computer-executable program instructions, when executed, further cause the computing device to further instantiate the dynamic data storage class by passing left side and right side single class data objects, thereby defining a composite dynamic data storage class.

7. The computer program product of claim 5 wherein the computer-executable program instructions, when executed, further cause the computing device to further instantiate the dynamic data storage class using a constructor that allows key-value pairs to be passed that represent the individual row of the table in the memory.

8. The computer program product of claim 5 wherein the computer-executable program instructions, when executed, further cause the computing device to further instantiate the dynamic data storage class by passing data representing the individual row of the table in the memory.

\* \* \* \* \*